US 6,537,961 B1

(12) United States Patent
Koch

(10) Patent No.: US 6,537,961 B1
(45) Date of Patent: Mar. 25, 2003

(54) AMPHIPHILE POLYMERS BASED ON POLYESTER WITH CONDENSED ACETAL GROUPS WHICH ARE LIQUID AT ROOM TEMPERATURE AND ARE USED IN DETERGENTS AND CLEANING AGENTS

(75) Inventor: Herbert Koch, Raesfeld (DE)

(73) Assignee: Sasol Germany GmbH, Hamburg (DE)

( * ) Notice: Subject to any disclaimer, the term of this patent is extended or adjusted under 35 U.S.C. 154(b) by 0 days.

(21) Appl. No.: 09/485,962

(22) PCT Filed: Jul. 15, 1998

(86) PCT No.: PCT/EP98/04392

§ 371 (c)(1),
(2), (4) Date: Apr. 28, 2000

(87) PCT Pub. No.: WO99/09125

PCT Pub. Date: Feb. 25, 1999

(30) Foreign Application Priority Data

Aug. 18, 1997 (DE) .......................................... 197 35 715

(51) Int. Cl.$^7$ .......................... C11D 3/37; C08G 63/668
(52) U.S. Cl. ....................... 510/476; 510/361; 510/434; 510/437; 510/479; 510/488; 510/533
(58) Field of Search ................................. 510/476, 361, 510/434, 437, 479, 488, 533

(56) References Cited

U.S. PATENT DOCUMENTS

| 3,424,726 | A | * | 1/1969 | Blumenfeld et al. .......... 260/75 |
| 3,959,230 | A |   | 5/1976 | Hays ........................ 260/75 R |
| 4,159,978 | A |   | 7/1979 | Violland et al. ............. 525/441 |
| 4,427,557 | A |   | 1/1984 | Stockburger ................ 252/8.7 |
| 4,569,772 | A |   | 2/1986 | Ciallella ..................... 252/8.6 |
| 4,571,303 | A |   | 2/1986 | Ciallella ................. 252/174.23 |
| 4,740,326 | A |   | 4/1988 | Hortel et al. ................. 252/90 |
| 4,785,060 | A |   | 11/1988 | Nagler ....................... 525/444 |
| 4,956,447 | A |   | 9/1990 | Gosselink et al. .......... 528/272 |
| 5,142,020 | A | * | 8/1992 | Kud et al. ................... 528/272 |
| 5,652,283 | A | * | 7/1997 | Boeckh et al. ................ 524/47 |
| 5,777,046 | A | * | 7/1998 | Boeckh et al. .............. 525/444 |
| 5,834,548 | A | * | 11/1998 | Jager et al. ................. 524/405 |

FOREIGN PATENT DOCUMENTS

| EP | 0066944 | B1 |   | 11/1986 |   |
| EP | 0319094 | A2 |   | 6/1989 |   |
| EP | 0357280 | A2 |   | 3/1990 |   |
| EP | 0253567 | B1 |   | 12/1990 |   |
| EP | 0241985 | B1 |   | 1/1991 |   |
| EP | 0523956 | A2 |   | 1/1993 |   |
| GB | 1088984 |   |   | 10/1967 |   |
| GB | 1516850 |   | * | 7/1978 | ........... D01F/11/08 |
| GB | 2137652 |   |   | 10/1984 |   |
| GB | 2165856 |   |   | 4/1986 |   |
| WO | WO 92/06152 |   |   | 4/1992 |   |

* cited by examiner

*Primary Examiner*—Yogendra N. Gupta
*Assistant Examiner*—Brian P. Mruk
(74) *Attorney, Agent, or Firm*—Browning Bushman P.C.

(57) ABSTRACT

Novel liquid amphilphile polymers based on polyesters having condensed acetal groups which are liquid at room temperature, the polymers being useful in powder or liquid detergents and cleaning agents and in textile processing.

11 Claims, No Drawings

AMPHIPHILE POLYMERS BASED ON POLYESTER WITH CONDENSED ACETAL GROUPS WHICH ARE LIQUID AT ROOM TEMPERATURE AND ARE USED IN DETERGENTS AND CLEANING AGENTS

BACKGROUND OF THE INVENTION

1. Field of the Invention

The object of the invention in question is formed by amphiphilic polymers, which are liquid at room temperature, on the basis of polyesters with condensed acetal groups pursuant to Formula I (soil-release polymers), their use in powdery and liquid washing and cleaning agents and the use of these agents in textile processing and for washing and cleaning contaminated surfaces, in particular hard surfaces and fabric surfaces.

2. Description of the Prior Art

The composition of formulations for washing and cleaning agents is a complex task, as the formulations must be in a position to remove soiling of various natures from soiled surfaces, e.g. fabric surfaces. In particular, quick and efficient removal of fatty or oily adhesions is generally problematic.

In order to maintain natural resources, not only is the use of tensides on the basis of replenishing raw materials necessary, but also, quite particularly, the production of formulations which become more and more effective despite a constant use of raw materials, yet also fulfil the requirements made of their biological decomposition. In addition, the formulations for washing and cleaning agents containing tensides, which are becoming more and more compact, must quickly dissolve in water in view of the decreasing amount of water in the washing process used for ecological reasons.

All these requirements can no longer be fulfilled in a physical way alone, but demand the use of higher-capability formulations with new, if possible multifunctional ingredients.

The state of the art contains washing and cleaning agents containing so-called "soil-repellent" and "soil-release" polymers. Inter alia, these compounds have the effect that released soil particles do not settle on the fabric again, thus not leading to greying.

DE-A-14 69 403 describes a process for surface-amendment treatment of articles derived from polyesters. In it, the manufactured polyesters of ethylene terephthalate units (ET) are enriched with ET:POET=2–6:1, with polyethylene glycol with mol weights of 1000–4000 being used (POET=polyoxyethylene terephthalate). The coating of the fibres is done by heat treatment with the polyester at temperatures of about 90° C., through which the fabric is given a lasting surface treatment, not only resulting in a protective layer, but also preventing static charging of the fabric.

In U.S. Pat. No. 4,427,557 and EP-A 0 066 944, anionically modified polyesters are described, which contain not only ethylene terephthalate and polyoxyethylene terephthalate units, but also, as further polymerisation components, the sodium salt of sulpho-isophthal acid. The polymerised polyethylene glycols (PEG) have mol masses of 200–1000 and, following their polymerisation with ethylene glycol (EG) and terephthal acid, result in polyesters with mol weights of 2000–10000.

U.S. Pat. No. 3,959,230 claims ET/POET polyesters with ET:POET=25:75–35:65, with low-molecular polyethylene glycols with mol weights of 300–700 being used and the polyesters obtained having mol weights of 25000–55000.

Alongside the effect as a soil-release polymer, EP-A-0 319 094 also claims the use of ET/POET co-polymers as textile ancillaries for the treatment of washing in automatic dryers. Here, the benefits of anti-static properties of the washing treated with soil-release polymers is particularly emphasised.

A favourably priced version of the soil-release polymers, i.e. as a method for introducing soil-release polymers into a watery formulation or into the washing liquid, is described in U.S. Pat. No. 4,740,326 with a "coating" onto a water-impermeable carrier. Various fibre systems such as nylon or a so-called Reemay fibre act as the foundation of the plugging.

As a further version of the above mentioned polyesters, the application of branched monomer glycol modules is claimed, e.g. 1,2-propylene, 1,2-butylene and 3-methoxy-1, 2-propylene glycogen (EP-A-0 241 985).

The performance of the soil-release polymers used (WO 92 06 152) can be increased in anionic or non-ionic tenside formulation by the addition of tensides on the basis of polyhydroxy fatty acid amides (glucamides).

A further modification of the polyesters contains the inclusion of cationic components on the basis of quartenary nitrogen compounds, which are claimed to be even more effective in comparison with non-ionic polyesters (U.S. Pat. No. 4,956,447).

In EP-A-0 253 567 and EP-A-0 357 280, there is particular description of capped polyesters, which are capped on the one hand by non-ionic groups such as C1- to C4-alkyl, C1- to C4-hydroxyalkyl, C1- to C4-acyl, as well as by ionic succinate groups.

The activity of a soil-release polymer in a liquid washing agent formulation as well as the storage stability of the formulation can be improved by the addition of small amounts of salt according to DE-A-34 11 941.

As a further version of soil-release polymers, DE-A-33 24 258 describes the release or dispersion of a PET/POET polyester with PET:POET=2–6:1 in a liquid, non-ionic tenside and spraying of this mixture onto a builder (PET-polyethylene terephthalate).

Through the depositing of the soil-release polymers together with alkaline washing agent components, the latter suffer losses of activity to be ascribed to a hydrolysis of the ester compounds. This can be counteracted by a fusion of PET/POET co-polymers with alkali-metal polyacrylates at 70 to 150° C. and subsequent pulverisation (U.S. Pat. No. 4,571,303, U.S. Pat. No. 4,569,772).

DE-A-37 27 727 states the use of PET obtained from waste bottles as a particular benefit in the production of PET/POET co-polymers.

DE-A-40 01 415 claims the synthesis and use of a polyester as a greying-inhibiting and soil-release additive for powdery and liquid washing agents. The polyesters are obtained by condensation of carbonic acids containing at least 2 carboxyl groups with multivalent alcohols. In addition, alkoxylated multivalent alcohols are used, which are obtained by attaching of 5–80 mol ethylene oxide (EO) and/or propylene oxide(PO). The products excel thanks to an improved effectiveness and a better compatibility with liquid and powdery washing agent formulations.

In EP-A-0 523 956, a washing agent formulation is described which contains a water-soluble or water-dispersible co-polymer containing a UV-absorbent monomer. The manufacture of this soil-release polymer is done by poly-condensation of DMT with EG, PEG (mol weight 200–3000) and methyl4-aminobenzoate (DMT=dimethyl terephthalate).

A feature of the soil-release polymers currently being claimed is their insufficient water-solubility or bad dispersibility in water. This results in such substances only partly passing into the washing water and thus having bad soil-release properties. Further, the soil-release polymers claimed up to now have a solid consistency. When they are later used in a formulation, this requires treatment, i.e. the soil-release polymer used in the reaction process must be ground, granulated or sprayed onto a carrier (e.g. sodium sulphate). Some of the soil-release polymers are also offered as an aqueous dispersion with the disadvantages of a low active content, separation of particles of solid matter during storage and the introduction of water when used in a washing agent formulation.

SUMMARY OF THE INVENTION

The invention in question is based on the task of providing new materials and washing agent additives without the impairing properties mentioned above.

The task is solved by the invention in question with subfactant polymers pursuant to the sum formula I. The object of the invention in question is therefore subfactant polyesters pursuant to the empirical sum formula I

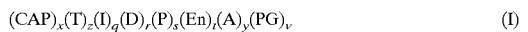

$$(CAP)_x(T)_z(I)_q(D)_r(P)_s(En)_t(A)_y(PG)_v \quad (I)$$

wherein (CAP) represents end groups which cap the polymer at the end and are
  a.) sulpho-aroyl groups
  b.) groups with the formula $MO_3$—S—$(O)_u$—$(CH_2)_p$—$(RO)_w$—, in which M stands for a metal ion, in particular alkaline (sodium or potassium salt being particularly preferred) or earth alkaline ion, ammonium ion or such substituted with one or more hydroxyalkyl residue with 2 to 4 C atoms in each of the hydroxyalkyl residue and R for ethylene or mixtures of ethylene and propylene, u for 0 or 1, p for 0 or 1 and w for a number from 1 to 100,
  c.) poly(oxyethylene)monoalkyl ether groups, wherein the alkyl group contains 1 to 24 C atoms and the poly-oxyethylene group comprises 2 to 200 oxyethylene units,
  d.) acyl and aroyl groups with 4 to 40 carbon atoms,
  e.) hydroxy-acyl and hydroxy-aroyl groups with 2 to 25 carbon atoms,
  f.) poly(oxyalkylene)monoalkyl phenol ethers, in which the alkyl group contains 6 to 18 carbon atoms and the poly-oxyalkylene group comprises 0 to 80 oxyalkylene units,
  g.) mixtures thereof
and x for numbers from 0 to 2,
(T) stands for an arylen dicarbonyl group and z for a number from larger 0 to 50
(i) for an internal anionic group and q for a number from 0 to 30,
(d) for an acetalic group and r for a number from larger 0 to 80,
(P) for a polyol group with at least 3 hydroxyl groups and s for a number from 0 to 80, with the share of the polyol being smaller 30 mol % relative to the total of the monomer units,
(En) for a poly(oxyalkylene)oxy-group composed of 2 to 100 oxyalkylene groups, preferable oxyethylene groups, with t meaning a number from 0–25 and the alkyl groups containing 2 to 6 C atoms,
(a) for a 1,n-alkylene dicarbonyl group composed of 2 to 24 C atoms and y for a number from 0 to 15,
(PG) for an oxypropylene oxy-group and v for a number from 0 to 80, and wherein the oligo/polyesters have molecular weight from 500 to 100,000.

The values for x, z, q, r, s, t, y and v in the sum formula I can also be arbitrary fractional figures within the limits stated.

A further object of the invention in question is the use of the soil-release polymers in powdery or liquid washing and cleaning agents and the use of these agents for washing and cleaning of soiled surfaces and in textile processing.

DESCRIPTION OF THE PREFERRED EMBODIMENTS

In the empirical sum formula, the ester units forming the basis of the rest (T)=arylen dicarbonyl group are preferably selected from terephthal acid, isophthal acid and phthal acid dialkyl ester, with mixtures of the components naturally being possible.

As a matter of principle, aliphatic diesters can be used as monomer units. The aliphatic diesters used as a basis under the group (A)y=1,n-alkylene dicarbonyl group are preferably selected from malon acid, succinic acid, fumaric acid, malein acid, glutaric acid, adipinic acid, pimelin acid, cork acid, azelain acid and sebacin acid dialkyl esters.

The end anionic groups stated under the designation (I) in the sum formula are preferably selected from sulpho-phthaloyl, sulpho-isophthaloyl (5-sulpho-isophthaloyl) and sulpho-terephthaloyl groups used in the form of their salts, in particular the alkaline (preferably sodium) or ammonium salts. Generally speaking, aliphatic, anionic monomers which are derived from sulphonated aliphatic diesters such as malein acid, adipinic acid, sebacin acid etc. diesters can also be used here.

The end groups bound via ester groups can be based on not only sulphoaroyl and other groups with the formula $MO_3$—S—$(O)_u$—$(CH_2)_p$—$(RO)_w$—, but also on acyl and aroyl groups with 4 to 40 carbon atoms as well as hydroxy-acyl and hydroxy-aroyl groups. Cap groups of this nature are claimed, for example, in DE 44 17 686. We would here mention the following typical representatives valerian acid, capronic acid, oenanthic acid, caprylic acid, pelargonic acid, caprinic acid, undecan acid, undecen acid, laurinic acid, benzoic acid, which carry 1 to 5 substituents to a total of up to 30 C atoms, in particular 1 to 12 C atoms, with all cap groups being introduced into the polymer in the form of their alkyl esters.

At this point, the following typical representatives of hydroxy-acyl and hydroxy-aroyl cap groups are mentioned: lactic acid, hydroxy-valerian acid, hydroxy-capronic acid, ricinolic acid, o-, m- and p-hydroxy-benzoic acid. The hydroxy-monocarbon acids can be connected with one another via their free hydroxyl group and/or their carboxyl group.

Poly(oxyalkylene)monoalkyl ethers are also stated as further cap groups. Preferably, ethoxylated alcohols with 1 to 24 carbon atoms in the alkyl residue and 2 to 200 oxyethylene units are used.

Further end groups of the soil-release polymers in the invention in question are formed by poly(oxyalkylene) monoalkyl phenol ethers, for example as claimed in DE 40 01 415.

The acetalic groups stated under the designation (D) in the sum formula are preferably selected from conversion products of formyl esters or dialdehydes or the acetates thereof with (preferably 2 mol) glycerine. The use of the conversion product of tetra-alkoxy propane with 2 mol glycerine is particularly preferred here. This is a mixed product of various isomer dioxolanes/dioxanes.

Structure formulae I:

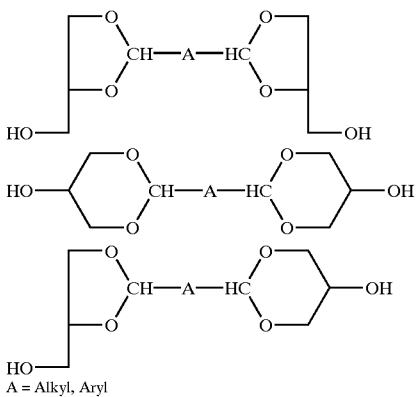

A = Alkyl, Aryl

The manufacture of the acetal monomers used in the synthesis of the polymers according to the invention in question is according to the state of the art by acidly catalysed acetalisation and/or re-acetalisation of the aldehyde components with glycerine.

Mineral acids such as HCl, $H_2SO_4$, $H_3PO_4$ or $HClO_4$, organic carbon and sulphonic acids such as methansulphonic acid, p-toluene sulphonic acid, oxalic acid, formic acid, acetic acid, propionic acid or Lewis acids such as $BF_3$, $AlCL_3$, $ZnCl_2$ or $TiCl_4$ are suitable as catalytic agents for the acetalisation/re-acetalisation reactions. In the gentler re-acetalisation, acid clay minerals such as Montmorillonite K10 can also be used.

Reaction equation:

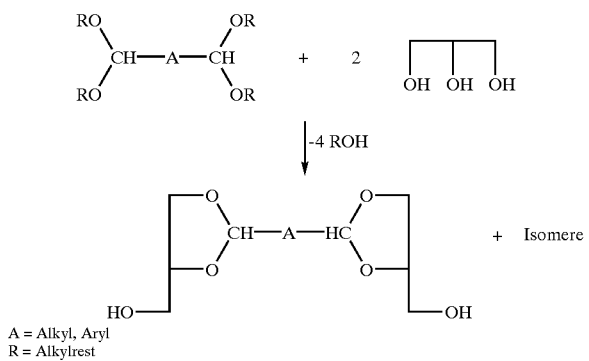

A = Alkyl, Aryl
R = Alkylrest

The polyol groups with at least 3 hydroxyl groups stated under the designation (P) in the empirical sum formula are preferably selected from mono, di- and tri-glycerine, trimethyl propane, sorbitol, pentaerythrite and erythrite. The use of glycerine is particularly preferred in this.

The soil-release polymers being claimed can be produced by conventional, known polymerisation procedures.

The synthesis of these polymers can be done in the form of a direct conversion of all monomer units in one step, with the result that statistically distributed polymers (so-called random structures) are obtained. Another mode of manufacture is a multi-step synthesis, e.g. of a kind in which a pre-condensation of various modules is carried out.

The alcohol formed in the re-esterisation is removed via a fractioning column and/or a de-phlegmator. As a matter of principle, temperatures of about 80 to 250° C. and pressures from standard pressure up to <1 mbar are used. The polymers obtained can be set to various molecular weights. These are preferably between 500 and 20,000.

All the catalysts known for re-esterisation reactions can be used as catalysts, e.g. titanates, mixtures of antimony trioxide and calcium acetate, stannanes, zinc acetate etc. As a matter of principle, titanates are to be preferred, as the conversions take place more quickly with these catalysts and the products obtained have a better colour quality.

The poly-/oligo-esters formed can partially be provided with various end groups. In this context "partially" means that the use of these end groups need not be done stoechiometrically, with the result that only a part of the polymer molecules in the polymer mixture (distribution) obtained is provided with cap groups. The partial inclusion of cap groups has, on the one hand, a regulating effect on the molecular weight, leading on the other hand to a stabilisation of the polymers obtained.

The use of sulpho-isophthalic acid dimethyl ester in a mixture with dimethyl terephthalate in this reaction step has proven to be beneficial with regard to the performance of the polymers obtained.

Depending upon the monomers selected [(internal anionic groups I) or anionic cap groups (CAP)], both anionic as well as non-ionic soil-release polymers are obtained.

The soil-release polymers to be used are particularly effective if the fabric has already been washed or impregnated with them before soiling.

Generally speaking, the soil-release polymers used, which are the object of the formulations in the invention in question, have a primary washing effect on the basis of their top or edge surface active character, this effect being able to lead to a considerable increase in the washing performance in the context of various formulations.

The amounts of soil-release polymer used are 0.05 to 25% by weight relative to the formulation in question. The subfactant polyesters or oligo-esters are preferably used in phosphate-free and phosphate-reduced washing agents.

The soil-release polymers in accordance with the invention in question can be dissolved or dispersed in water. They can be used in the production of washing agents in various forms. Due to their liquid consistency, they can generally be introduced into washing agent formulations with all methods also used in the treatment of liquid,. non-ionic tensides.

EXAMPLES

Example 1

(Conversion Product of Tetra-methoxypropane with Glycerine)

In a 500 ml multi-neck flask with glass agitator, heating bath (oil), distillation super-structure, filling body column, vacuum distributor, distillation flask, cooling trap and inner thermometer, a total of 164.2 mg (1.0 mol) of 1,1,3,3-tetraethoxypropane of Hüls AG and 193.4 g (2.1 mol) of water-free glycerine are placed. After addition of 0.2% by weight toluene sulphonic acid, the two-phased reaction mixture was heated to temperatures of 90 to 100° C. under strong agitation and the methanol formed trapped.

After a large part of the amount of methanol to be expected theoretically had been trapped, a vacuum (20 mbar) was applied for 30 min., in order to remove the remaining amount of methanol distillatively. The product was obtained with a yield of 91%.

Example 2

In a 4 l multi-neck flask with glass agitator, heating bath (oil), induction of protective gas, distillation superstructure, filling body column, distillation bridge, vacuum distributor, distillation flask, cooling trap and inner thermometer, a total of 960 g (2.2 mol) of polyethylene glycol mono-methyl ether with a mean molecular weight of aprox. 44 g/mol (Marlipal® 1/12 of Hüls AG), 13.2 g of the dioxan/dioxolan monomer from example 1, 583 g (3.0 mol) of dimethyl terephthalate, 114 g (1.5 mol) of 1.2-propylene glycol, 221 g (2.4 mol) of glycerine, 1.6 g of 2,6-di-tert.-butyl-p-cresol (Ionol® from Shell) as well as 1 ml of tetra-isopropyl orthotitanate were added under protective gas.

The reaction mixture was slowly heated to temperatures of 150 to 220° C. and the methanol formed was trapped.

After a large part of the amount of methanol to be expected theoretically had been trapped, the reaction mixture was cooled, the column dismantled, a vacuum (<1 mbar) was applied and the mixture heated again to a maximum of 230° C.

The propylene glycol and glycerine not converted in the reaction were trapped as a distillate.

After the product had reached a hydroxyl figure of approx. 100 mg KOH/g of substance, the reaction was stopped.

Example 3

As an analogy to example 2, a total of 205 g (2.7 mol) of polyethylene glycol with a mean molecular weight of approx. 440 g/mol (Marlipal® 1/12 of Huls AG), 583 g (3.0 mol) of dimethyl terephthalate, 251 g (3.3 mil) of 1,2-propylene glycol, 10 g of the dioxan/dioxolan monomer from example 1, 1.6 g of 2,6-di-tert.-butyl-p-cresol (lonol® from Shell) as well as 1 ml of tetra-isopropyl orthotitanate were added under protective gas.

The reaction mixture was again slowly heated to temperatures of 150 to 220° C. and the methanol formed was trapped.

After a large part of the amount of methanol to be expected theoretically had been trapped, the reaction mixture was cooled, the column dismantled, a vacuum (<1 mbar) was applied and the mixture heated again to a maximum of 230° C.

The 1,2-propylene glycol not converted in the reaction were trapped as a distillate.

After the product had reached a hydroxyl figure of approx. 50 mg KOH/g of substance, the reaction was stopped.

Example 4

As an analogy to example 2, a total of 680 g (1.7 mol) of polyethylene glycol with a mean molecular weight of approx. 400 g/mol (Lipoxol® 400 of Hüls AG), 168 g (0.5 mol) polyethylene glycol mono-methyl ether with a mean molecular weight of approx. 335 g/mol (Marlipal® 1/7 of H üls AG), 583 g of di-methyl terephthalate, 152 g (2 mol) of 1,2-propylene glycol, 175 g (1.9 mol) of glycerine, 15 g of the dioxan/dioxolan monomer from example 1, 1.6 g of 2,6-di-tert.-butyl-p-cresol (Ionol® from Shell) as well as 1 ml of tetra-isopropyl orthotitanate were added under protective gas.

The reaction mixture was again slowly heated to temperatures of 150 to 220° C. and the methanol formed was trapped.

After a large part of the amount of methanol to be expected theoretically had been trapped, the reaction mixture was cooled, the column dismantled, a vacuum (<1 mbar) was applied and the mixture heated again to a maximum of 230° C.

The 1,2-propylene glycol and glycerine not converted in the reaction were trapped as a distillate.

After the product had reached a hydroxyl figure of approx. 80 mg KOH/g of substance, the reaction was stopped.

What is claimed is:

1. Amphiphilic polyesters, liquid at room temperature, having the empirical sum formula:

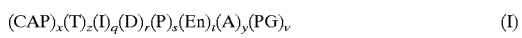

$$(CAP)_x(T)_z(I)_q(D)_r(P)_s(En)_t(A)_y(PG)_v \quad (I)$$

wherein (CAP) represents end groups which cap the polymer at the end and are selected from
  a. sulphoaroyl groups,
  b. groups having the formula $MO_3$—S—$(O)_u$—$(CH_2)_p$—$(RO)_w$—, in which M is a metal ion, an ammonium ion or a substituted ammonium ion, R is ethylene or mixtures of ethylene and propylene, u is 0 or 1, p is 0 or 1 and w is from 1 to 100,
  c. poly(othyethylene)monoalkylether groups, wherein the alkyl group contains 1 to 24 C atoms and the poly-oxyethylene group comprises 2 to 200 oxyethylene units,
  d. acyl and aroyl groups with 4 to 40 carbon atoms,
  e. hydroxy-acyl and hydroxy-aroyl groups with 2 to 25 carbon atoms,
  f. poly(oxyalkylene)monoalkyl phenol ethers, in which the alkyl group contains 6 to 18 carbon atoms and the poly-oxyalkylene group comprises 0 to 80 oxyalkylene units, and
  g. mixtures thereof
and x is from 0 to 2,
(T) is an arylen dicarbonyl group and z is from grater than 0 to 50,
(I) is an internal anionic group and q is from 0 to 30,
(D) is an acetalic group obtained from reacting glycerine with a compound selected from the group consisting of dialdehydes, formyl esters, acetales of dialdehydes, acetales of fonnyl esters and mixtures thereof, said acetalic group containing at least one of the following cyclic structures:

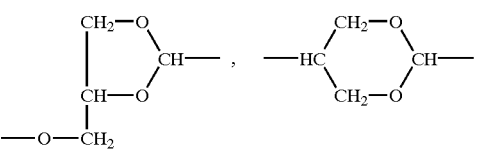

and r is from greater than 0 to 80,
(P) is a polyol group with at least 3 hydroxyl groups and s is from 0 to 80, with the share of the polyol being smaller 30 mol % relative to the total of the monomer units,
(En) is a poly(oxyalkylene)oxy-group containing from 2 to 100 oxy-alkylene groups and t is from 0 to 25 and the alkyl groups contain 2 to 6 C atoms,
(A) is a 1,n-alkylene dicarbonyl group composed of 2 to 24 C atoms and y is from 0 to 15, (PG) is an oxypropylene oxy-group and v is from 0 to 80, and wherein the oligo/polyesters have molecular weights from 500 to 100,000.

2. Amphiphilic polyesters according to claim 1 wherein the polymers have molecular weights from 500 to 20,000.

3. Amphiphilic polyesters according to any one of claims 1 or 2 wherein (T) is a terephthalate group.

4. Amphiphilic polyesters according to claim 1 wherein (En) is a poly(oxyethylene)oxy-group.

5. Amphiphilic polyesters according to claim 1 wherein (I) is the sodium salt of the 5-sulpho-isophthaloyl group.

6. Amphiphilic polyesters according to claim 1 wherein (P) is a glycerine group.

7. Amphiphilic polyesters according to claim 1 wherein the acetalic group (D) comprises the conversion product of a dialdehyde with 2 mol of glycerine.

8. Amphiphilic polyesters according to claim 1 wherein the acetalic group (D) comprises the conversion product of a tetra-alkoxy propane with 2 mol of glycerine.

9. Amphiphilic polyesters according to claim 1 wherein the acetalic group (D) comprises the conversion product of a formyl ester with 2 mol of glycerine.

10. Amphiphilic polyesters according to claim 1 wherein y is 0.

11. Amphiphilic polyesters according to claim 1 wherein q, x and y are 0.

* * * * *

UNITED STATES PATENT AND TRADEMARK OFFICE
CERTIFICATE OF CORRECTION

PATENT NO. : 6,537,961 B1
DATED : March 25, 2003
INVENTOR(S) : Herbert Koch

It is certified that error appears in the above-identified patent and that said Letters Patent is hereby corrected as shown below:

<u>Column 8,</u>
Line 47, delete "fonnyl" and insert "formyl"
Line 66, delete "of2" and insert -- of 2 --

Signed and Sealed this

First Day of July, 2003

JAMES E. ROGAN
*Director of the United States Patent and Trademark Office*